United States Patent [19]

Borsuk

[11] Patent Number: 5,233,333
[45] Date of Patent: Aug. 3, 1993

[54] PORTABLE HAND HELD READING UNIT WITH READING AID FEATURE

[76] Inventor: Sherwin M. Borsuk, 80 Parker Ave., Meriden, Conn. 06450

[21] Appl. No.: 526,456

[22] Filed: May 21, 1990

[51] Int. Cl.⁵ .............. G09G 3/04; G09B 21/00; G09B 5/06
[52] U.S. Cl. .................. 340/731; 340/749; 434/112; 434/317
[58] Field of Search ............... 340/715, 716, 717, 718, 340/711, 712, 706, 731, 724, 748, 749, 799, 728; 434/307, 112, 308, 317; 364/705.06, 709.13, 708, 709.12

[56] References Cited

U.S. PATENT DOCUMENTS

| | | |
|---|---|---|
| 3,193,859 | 1/1976 | Kyriakides et al. |
| 3,612,676 | 10/1971 | Ooba et al. |
| 3,751,825 | 8/1973 | Barrett. |
| 3,925,779 | 12/1975 | Gerstenhaber. |
| 3,938,139 | 2/1976 | Day. |
| 4,021,932 | 5/1977 | Lipps. |
| 4,107,786 | 8/1978 | Masaki et al. ............ 340/731 |
| 4,159,417 | 6/1979 | Rubincam ............ 340/706 |
| 4,160,242 | 7/1979 | Fowler et al. |
| 4,191,956 | 3/1980 | Groothuis. |
| 4,254,416 | 3/1981 | Lelke ............ 340/728 |
| 4,350,070 | 9/1982 | Bahu ............ 340/711 |
| 4,367,533 | 1/1983 | Wiener ............ 340/731 |
| 4,545,023 | 10/1985 | Mizzi ............ 364/708 |
| 4,622,546 | 11/1986 | Sfarti et al. ............ 340/748 |
| 4,639,225 | 1/1987 | Washizuka ............ 434/308 |
| 4,700,840 | 10/1987 | Haddock. |
| 4,755,955 | 7/1988 | Kimura et al. ............ 340/724 |
| 4,820,167 | 4/1989 | Nobles et al. ............ 434/317 |
| 4,855,725 | 8/1989 | Fernandez ............ 434/317 |
| 4,985,697 | 1/1991 | Boulton ............ 340/799 |

FOREIGN PATENT DOCUMENTS 2149544 6/1985 United Kingdom.

Primary Examiner—Alvin E. Oberley
Assistant Examiner—Steve Saras
Attorney, Agent, or Firm—McCormick, Paulding & Huber

[57] ABSTRACT

A hand held portable reading unit having a screen capable of presenting characters in variable font sizes is provided for readers, such as the visually impaired, allowing them to read characters in a font size most comfortable to them. The reader effects font size changes by depressing a font size select button, in turn activating a counter incremented the number of times the button has been depressed to generate the corresponding size font desired. The incremented counter may be used to address a particular place in memory where bit-mapped characters of different font sizes are stored or may be used as a scalar inputted into a character scaling algorithm to generate a desired character font size. The stored textual data may further be presented in useable form to the blind wherein an audible processor is utilized to convert the stored character code into audible signals inputted into a speaker.

16 Claims, 6 Drawing Sheets

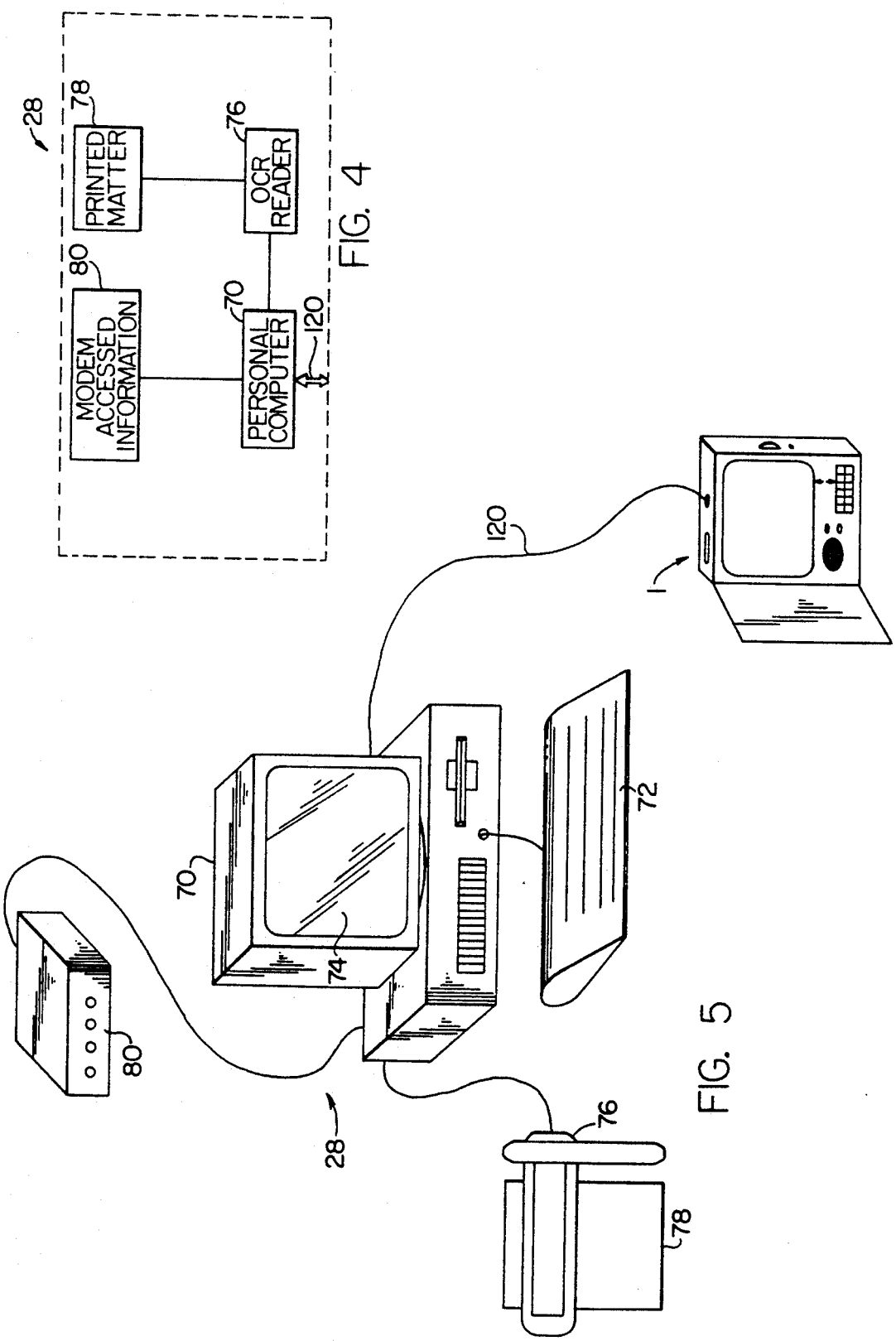

PORTABLE HAND HELD READING UNIT WITH READING AID FEATURE

BACKGROUND OF THE INVENTION

The present invention resides in a portable hand held reading unit having a display screen for displaying text encoded on transferable memory means and, more particularly relates to a device capable of being used by the visually impaired wherein means are provided for presenting text from novels, periodicals or other sources for reading by a user in such a way that the characters of the text displayed may be altered in size permitting the user to read text that which otherwise would be too uncomfortable or even impossible to see.

Individuals who suffer visual impairments yet who are not totally blind do not enjoy the ability to readily pick up books, commercially available periodicals and newspapers or the like for the purpose of casual or even extensive reading. Casual reading most frequently occurs while a person is in a waiting room or in transit on a train or in a plane or other environments in which reading materials may be readily carried and therefore easily employed to productively pass time. Extensive reading on the other hand may occur at home or in the office for the purpose of gaining sought after information, such as in the case of research. Regardless of where one chooses to read and under what circumstances, visually impaired persons would be greatly served by a portable, hand held unit which would allow them see text in a comfortable font size because commercially available printed books, periodicals and newspapers are often printed with very small text usually on the order of approximately three point or so requiring an individual even with normal eyesight to strain while reading. Although visually impaired, these individuals nevertheless possess the ability to read quite well if text is presented for reading in large enough font sizes. Additionally, since the vision of each individual may be impaired to a different degree than another, variable font sizes should be provided for allowing each user to read comfortably in relation to their own degree of visual impairment. While a visually impaired person may be able to use alternative media sources for obtaining daily news or periodical literature, such as often found in the form of audio tapes or the like, such sources however fail to allow the visually impaired individual the opportunity to exercise their reading skills. Moreover, such tapes do not allow the user to select a pace comfortable to his or her understanding and compression. Additionally, audio tape libraries do not always have the most current information available such as in the case of newspapers where timely dissemination of information is most important to its value.

Some headway has been made in the area of electronic data storage of text for portable reading devices, but the needs of those who require additional aid for reading materials such as aforementioned have simply not been met. These also include those individuals who simply suffer from vision fatigue caused by eyestrain attributable to the constant stress brought about by reading text having a small font size. With the advent of graphic scanners and character recognition programs as well as high volume, inexpensive, storage media, such as 256K ROM and RAM chips, the ability now exists to download voluminous textual information and data into transferable memory media. Thus, visually impaired individuals would be greatly served if they could readily read from a portable hand held unit in which means are provided for easily varying the font size of the characters displayed on the portable reading device.

Although devices in which digitally encoded text is displayed on a screen of a hand held unit are known, such as disclosed in U.S. Pat. No. 4,855,725 issued to Emilio Fernandez on Aug. 8, 1989, these devices nevertheless likewise fail to meet the particular needs of the visually impaired because they use a standard fixed font size. Additionally, the device disclosed in this patent does not allow the unit to be taken out of a designated range from the host computer, such as on a train or plane, since it uses an active communication link in the form of an IR transceiver linked with the host computer.

In U.S. Pat. No. 4,159,417 issued to David Ribincam, an electronic book is disclosed in which a magazine or other printed media is displayed on a thin screen. It should be realized that this patent also fails to accommodate the needs of the visually impaired or the visually strained individual by requiring the user to read text characters presented in a fixed font size rather than allowing the user to select the font size most suited to his or her needs.

Accordingly, it is an object of the present invention to provide a portable hand held reading unit having a screen and memory capable of storing large volumes of textual data and subsequently presenting the text on the screen in selectably different font sizes according to instructions readily issued by the user.

It is yet another object of the present invention to provide a reading unit of the aforementioned type in which means are provided for easily selecting a different font size by depressing a button on the unit to advance the character display to the next successive size.

It is yet a further object of the present invention to provide a unit of the aforementioned type wherein means are provided to alternatively permit the data stored in the unit to be presented audibly as well as visually.

Still a further object of the present invention is to provide a reading unit of the aforementioned type wherein data may be downloaded into it from either a mass data storage base or an insertable transportable storage medium.

Another object of the present invention is to provide a reading unit of the aforementioned type in which text can be electronically marked in memory such that that point in the text may be first displayed when the unit is re-used.

SUMMARY OF THE INVENTION

The present invention resides in a hand held portable reading unit for generating text in variable font sizes on a screen according to the size most comfortably fitting the needs of a user.

The reading unit of the present invention employs a microcomputer means linked with the display screen, a user interface means, a memory means and a variable font size means for displaying on the screen text inputted into the memory means in different font sizes as designated by the user. The variable font size means provided for varying the font sizes of the characters displayed on the screen may take the form of either differently sized bit-mapped characters or may take the form of scaling program in which a single font size is altered mathematically. The interface means includes an external character select button operating an incrementing means increased by the user each time the select button is depressed. The incrementing means provides an output source which may be used to access a particular storage location in which a selected one of the different font sizes are stored in bit-mapped arrangement. Alternatively, the incrementing means may be utilized as a scalar where a scaling algorithm is provided to alter the font size of the characters being displayed on the screen.

The reading unit further includes a self-contained power source in the form of a rechargeable battery which maintains the text stored in volatile memory in the memory means during periods of non-use and maintains the last displayed text in a register such that this text is the first presented when the reading device is again used.

The invention further resides in an audio processor and associated speaker and a speech synthesis program providing a means by which text downloaded into the memory means may be subsequently translated into audible output signals.

BRIEF DESCRIPTION OF THE DRAWINGS

FIG. 4 illustrates schematically a peripheral system which may be utilized with the portable reading unit of the present invention.

FIG. 5 is a perspective view of the peripheral devices shown schematically in FIG. 4 as connected with the portable reading unit.

DETAILED DESCRIPTION OF THE PREFERRED EMBODIMENT

Figure 1:
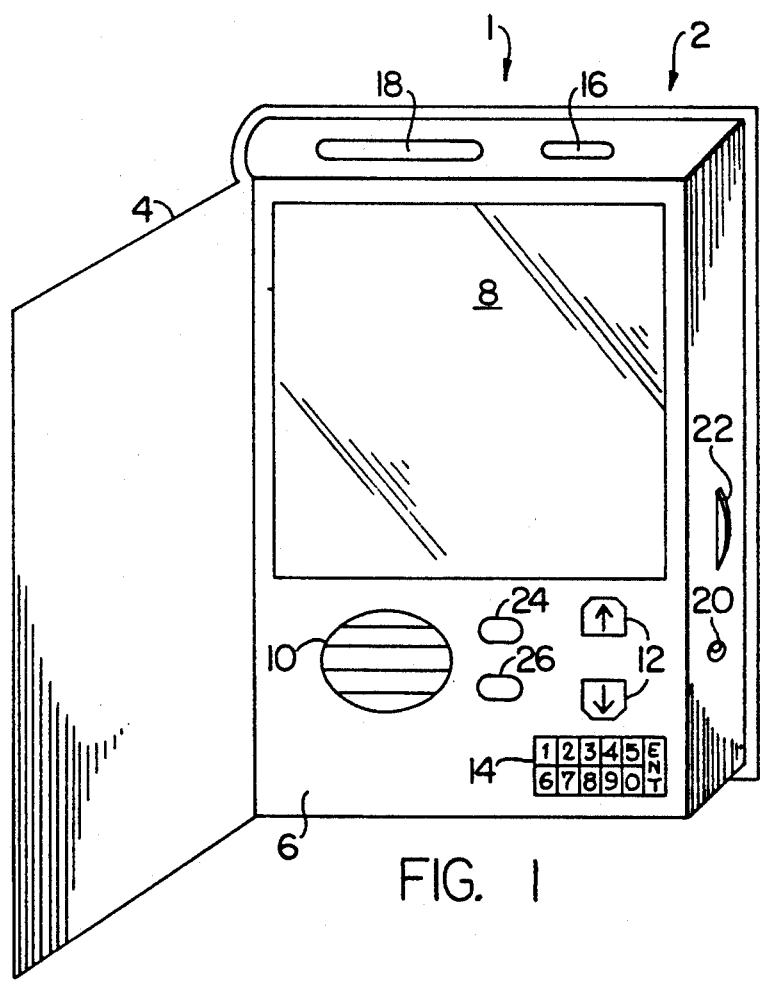
FIG. 1 is a perspective view of the portable hand held reading unit embodying the present invention shown in its open condition with its display screen exposed.

As illustrated in the figures and first referring to FIG. 1, a portable hand held reading unit 1 according to the preferred embodiment of the invention is shown. The reading unit 1 includes a generally rectangular housing 2 having a hinged cover 4 giving the unit the look and feel of an ordinary book in size and handling and having a front page face 6 in which are located a liquid crystal display screen 8, a speaker 10, directional scrolling arrows 12 for scrolling text in a line by line manner and a ten-key numeric keypad 14 including an "ENTER" button for advancing a window of text at a time on the screen 8. The LCD screen 8 in the preferred embodiment has an array of approximately 480 lengthwise by 360 widthwise pixels creating a 9" diagonal viewing screen.

About the periphery of the housing 2 of the reading device 1 are located data input receiving means comprising a serial communication port 16 and a storage media device insert port 18 in which an erasable and programmable read-only memory (EPROM) device 41 or a microfloppy or CD ROM is received. Also located here are a headphone port 20 and a volume control adjustment means 22. The reading unit 1 further includes a display size select button 24 for varying the font sizes of the characters displayed on the screen 8 and a speech activate button 26 for activating a speech synthesis program within the reading device 1 to audibilize the encoded text which has been inputted into it. Each of the select buttons 24 and 26 as well as those on the keypad 14 may be marked in braille for positive identification by a visually impaired user.

Figure 2:
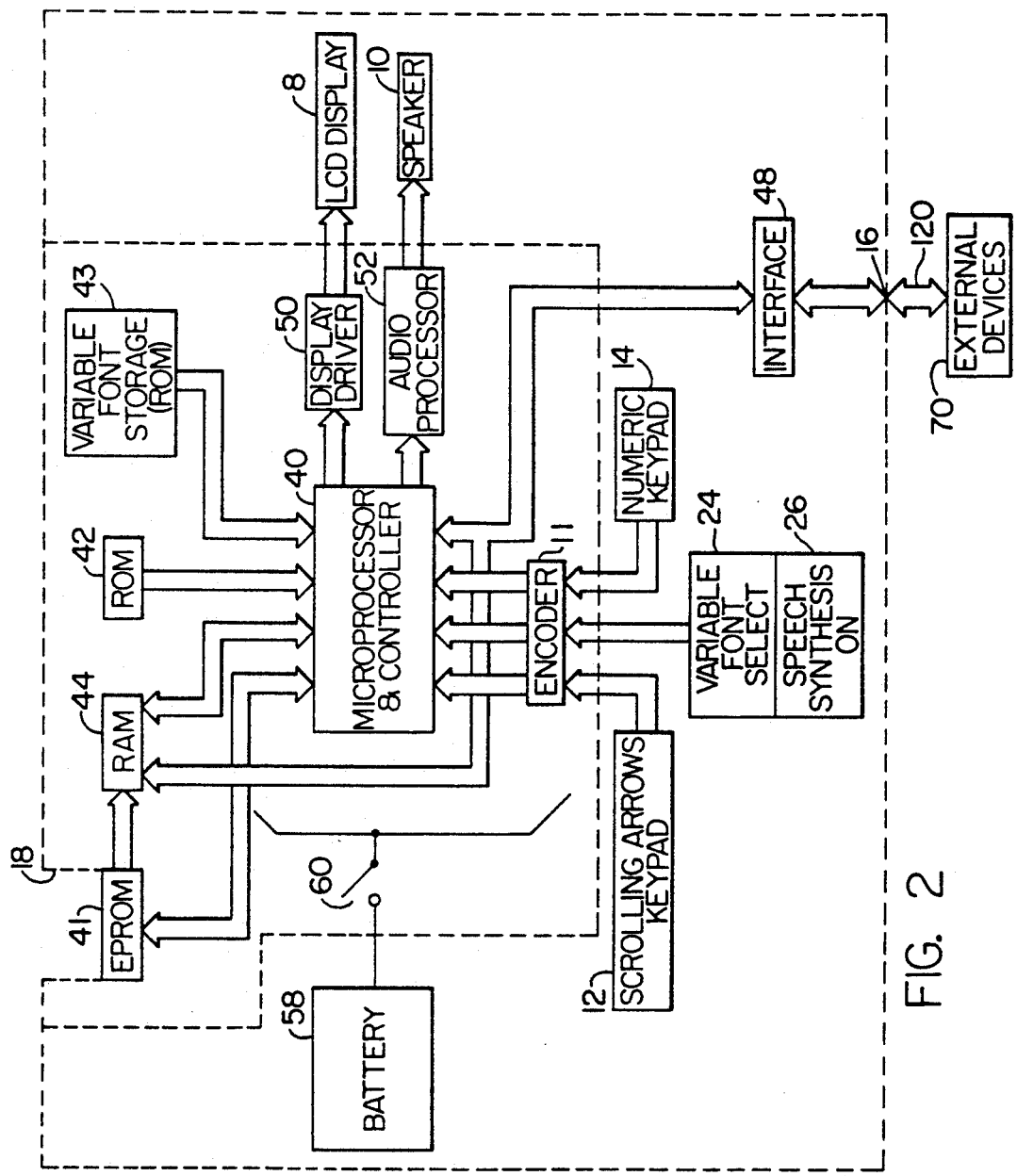
FIG. 2 is a schematic diagram showing the control system employed by the portable reading unit of FIG. 1.

Referring now to FIG. 2, there is provided in the reading device 1 a microcomputer means, hereinafter referred to as CPU 40, comprised of a microprocessing unit and a controller coupled by appropriate buses to a read only memory (ROM) 42 and a random access memory (RAM) 44. Also linked by appropriate bus means are the insertable read-only memory device 41, the serial communication port 16 and the interface 48 for communicating with external devices 70. The CPU 40 is further coupled to an audio processor 52 connected to the speaker 10 for converting data inputted as character code into signals driving the speaker 10. Additionally, a display driver 50 is coupled to the CPU 40 and to the screen 8 for causing the character code inputted in the RAM file 44 to be displayed in graphic format. The variable font and audio select buttons 24 and 26, as well as the scrolling arrows 12 and the key pad 14 each operate appropriate switches linked for communication with the CPU 40 by an encoder 11 thereby allowing the user to instruct the CPU to carryout desired operations as will be hereinafter discussed.

The reading unit 1 is battery powered in the preferred embodiment by a rechargeable lithium long-life battery 58 and is connected to the CPU 40 by a power-up switch 60 operated between an OFF and an ON condition by opening and closing the cover 4 thereby boosting power in the system to a level adequate to operate the display screen 8. In addition, the battery 58 may be provided with a jack connectable to a DC adaptor such that it may be charged for use over prolonged periods.

The reading unit 1 utilizes the RAM 44 as the resident text file memory into which data representing text is stored. The data stored in the RAM 44 is in the form of character code with each letter or other character identified by an ASCII code. The declining cost of RAM chips makes it economically feasible for the entire contents of a large book on the order of 500 pages to be stored in RAM. While ordinarily considered to be a volatile memory source, in the preferred embodiment of the invention, a low power setting maintained by the battery 58 retains the RAM files and register data during periods of non-use. As will become apparent later, maintaining a power supply for the RAM 44 during non-use periods provides the feature of allowing the user to continue reading from the place where he or she last left off.

The CPU 40 responds to a portion of a control program stored in the ROM 42 to cause the text files stored in the RAM 44 to be displayed on the LCD screen 8 in an appropriate font size selected in accordance with instructions issued by the user using the numeric keypad 14 and the font size select button 24 in conjunction with the directional scroll arrows 12. In addition to this, the program used by the audio processor 52 for converting the encoded text in RAM into audible words is stored in the ROM and when requested, is downloaded for use by the audio processor 52. Although the program for controlling the operations of the microprocessor means 40 will be discussed in greater detail with reference to FIGS. 6a and 6b, it should nevertheless be understood that the programs used for speech synthesis and the graphic presentation of data in character form are well known and are today readily commercially available.

Additionally, a variable font size means 43 linked with the above by an appropriate system bus is provided for varying the font size of the characters displayed on the screen 8 according to the character size desired by the user. As is shown respectively in FIGS. 3a and 3b, the variable font size means 43 may take the form of either different character sizes bit-mapped in memory or may take the form of a scaling algorithm. Referring first to the embodiment shown in FIG. 3a in which bit-mapped character shapes are employed, it should be seen that stored for example in four different memory locations are character shapes defined by bit-mapping them in a different font size in each memory location, ranging for example from 12 to 64 point. Each font size is stored in a separate memory location identified by a font I.D. heading which is accessed when the user instructs the CPU 40 to do so.

Figure 3A:
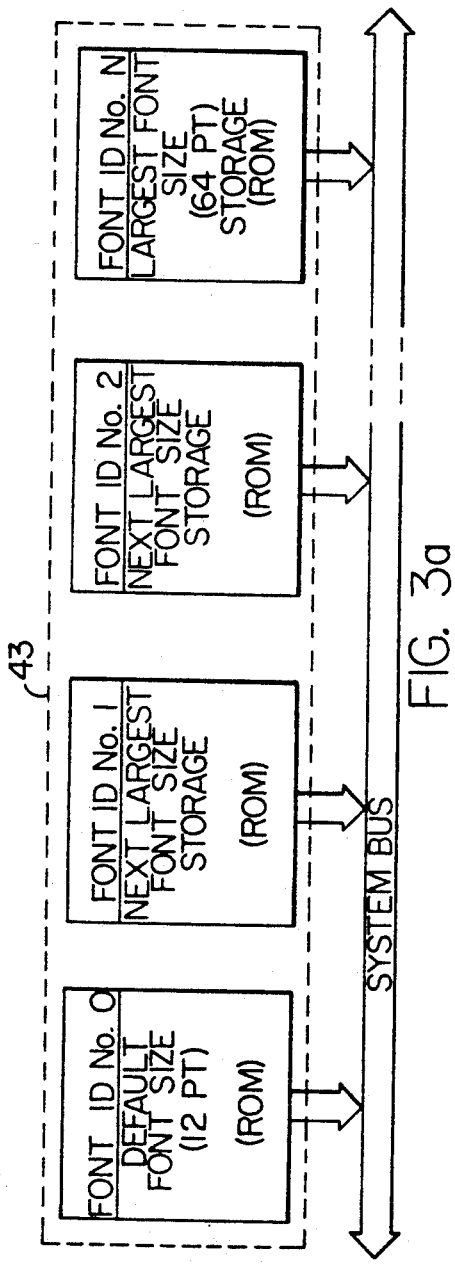
FIG. 3a shows a first embodiment of the variable font size means used in the present invention.
Figure 3B:
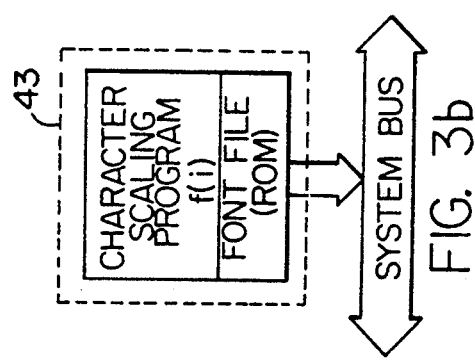
FIG. 3b shows an alternative embodiment of the variable font size means used in the present invention.

Alternatively, as shown in FIG. 3b, a character scaling program f(i) may be provided in storage location 43 to mathematically alter a single font file by utilizing a variable scalar capable of being incremented by the font select button 24 in the algorithm. With this embodiment, it should be appreciated that a significant savings in memory is achieved, with the tradeoff being that the resolution found with bit-mapped characters not being present. It should be noted that bit mapping of different character sizes is known in the art and that to date, mathematical formulas that redefine scalable characters are now commercially available, such as, one available by Post Script from Adobe Systems, Inc.

To effect font size selection, and as will be discussed again with reference to FIGS. 6a and 6b, a counter means may be employed by the system (step 89) and linked to the encoder 11 such that a variable i is incremented every time the user depresses the font select button 24 to arrive at a desired font size. In the embodiment of FIG. 3a wherein the characters are bit-mapped, the variable i may be utilized as a locating means for identifying an appropriate address in the storage location 43 by successively depressing the font select button 24 until the desired font size is displayed. For example, when the system is first powered up, the variable i is initialized to zero (step 74) with the result being that the text will first be displayed in a default font size located at I.D. address zero. As the user subsequently depresses the font select button 24 and increments the variable i, for example, n number of times, the corresponding address of the associated font size stored in memory under the I.D. code n, will be located and subsequently utilized as the appropriate character shape. In the embodiment of FIG. 3b where scalable fonts are used, the user by depressing the display size select button 24 a successive number of times, inputs a corresponding scalar value to cause the CPU 40 to employ it in the program f(i) to mathematically alter the character size of the font file. Thus, in either embodiment the characters stored in the resident text file in the RAM 44 may be displayed on the screen 8 in different font sizes according to the number of times the user depresses the font size select button 24. This allows a visually impaired individual to readily change the character size of the text displayed on the screen 8 by simply depressing the button 24 another time in order to advance to the next character size.

The text data stored in location 44 is in the form of text characters inputted into the reading unit 1 from a variety of different input sources. These encoded characters may be downloaded from the insertable EPROM 41 source, or even a portable ROM device, all of which may take the form of a chip, microfloppy disk, micro CD ROM, or optical card placed into the port 18 in the housing 2. These storage devices may in turn be loaded with data from the texts of literary works such a novels, tabloids or periodicals that have been transformed into digital format consequently used by the reading unit 1.

Alternatively, the textual data inputted into the RAM 44 may be downloaded from a larger mass storage data base, such as shown generally by reference numeral 28 in FIGS. 4 and 5. To this end, a serial communication line 120 connected to the serial communication port 16 and to the communication interface 48 link the reading unit 1 with a personal computer (PC) 70 such that digitally encoded data may be downloaded into the reading unit 1 from a variety of different sources. The external data base further includes a keyboard 72 and a display screen 74 linked with the personal computer (PC) 70 and may be further connected to an optical character recognition (OCR) reader 76 which is capable of scanning printed matter 78 and subsequently inputting this data into the PC 70 for conversion into computer readable numeric code which may be subsequently entered into the reading unit 1. Additionally, a telephone modem 80 may be provided and linked with the PC 70 allowing access to text files from multiple remote locations as well. The keyboard 72 also allows a user to type a personal message into the computer 70 and thereafter have it transmitted to the reading unit 1 for storage in the RAM 44 and for later use by the user.

It is a feature of the invention to provide an alternative medium for presenting the data stored in the resident text file memory 44 for a user who is blind. For this purpose, character codes stored in the RAM 44 may alternatively be utilized by the audio processor 52 for subsequent signal processing to convert the digitized words into signals for audible output through the speaker 10. A speech synthesis program is downloaded into the audio processor 52 subsequent to the user activating a speech request command by depressing the speech synthesis button 26.

Figure 6A:
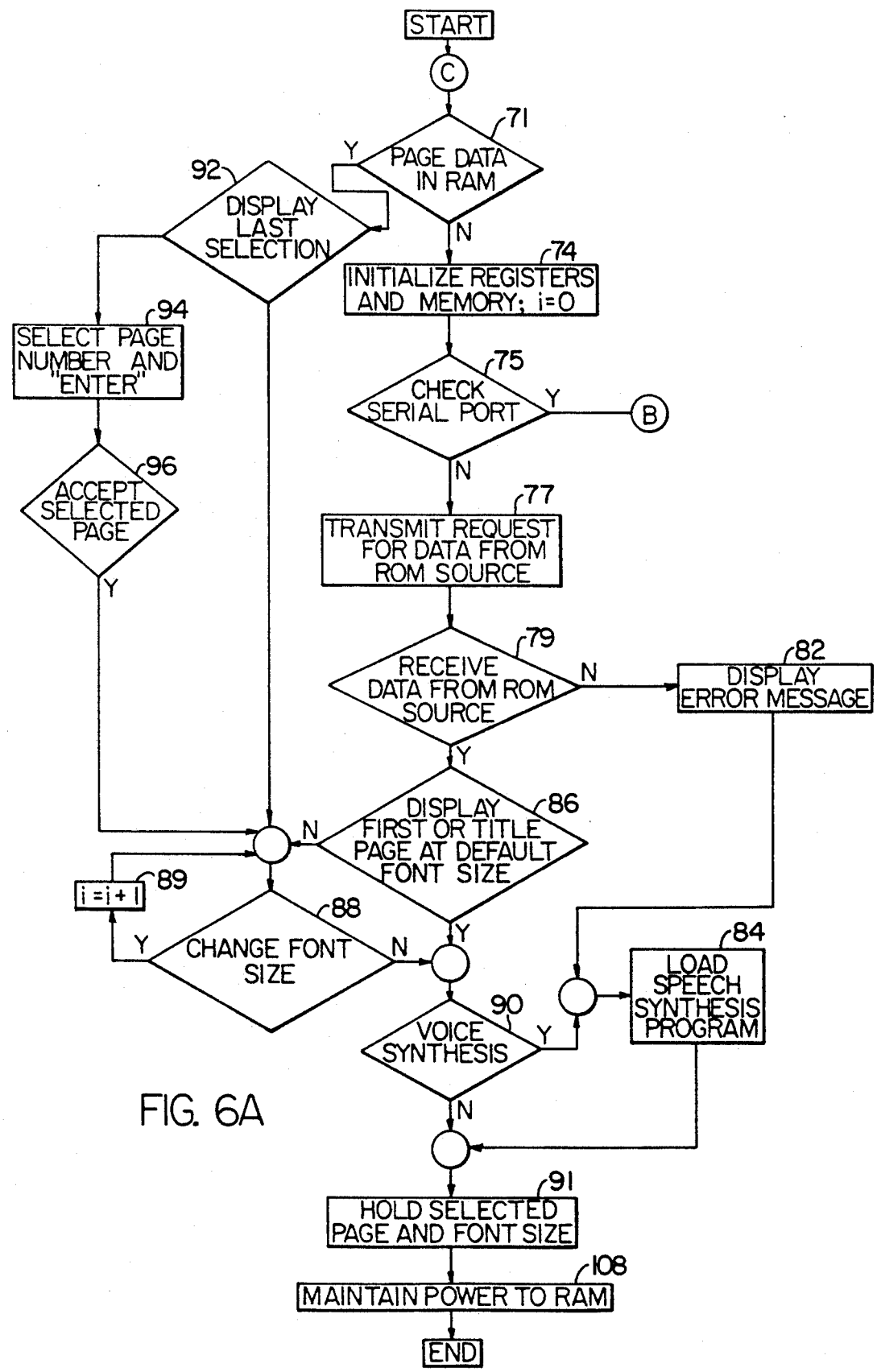
FIGS. 6a and 6b illustrate the algorithm utilized for processing data.
Figure 6B:
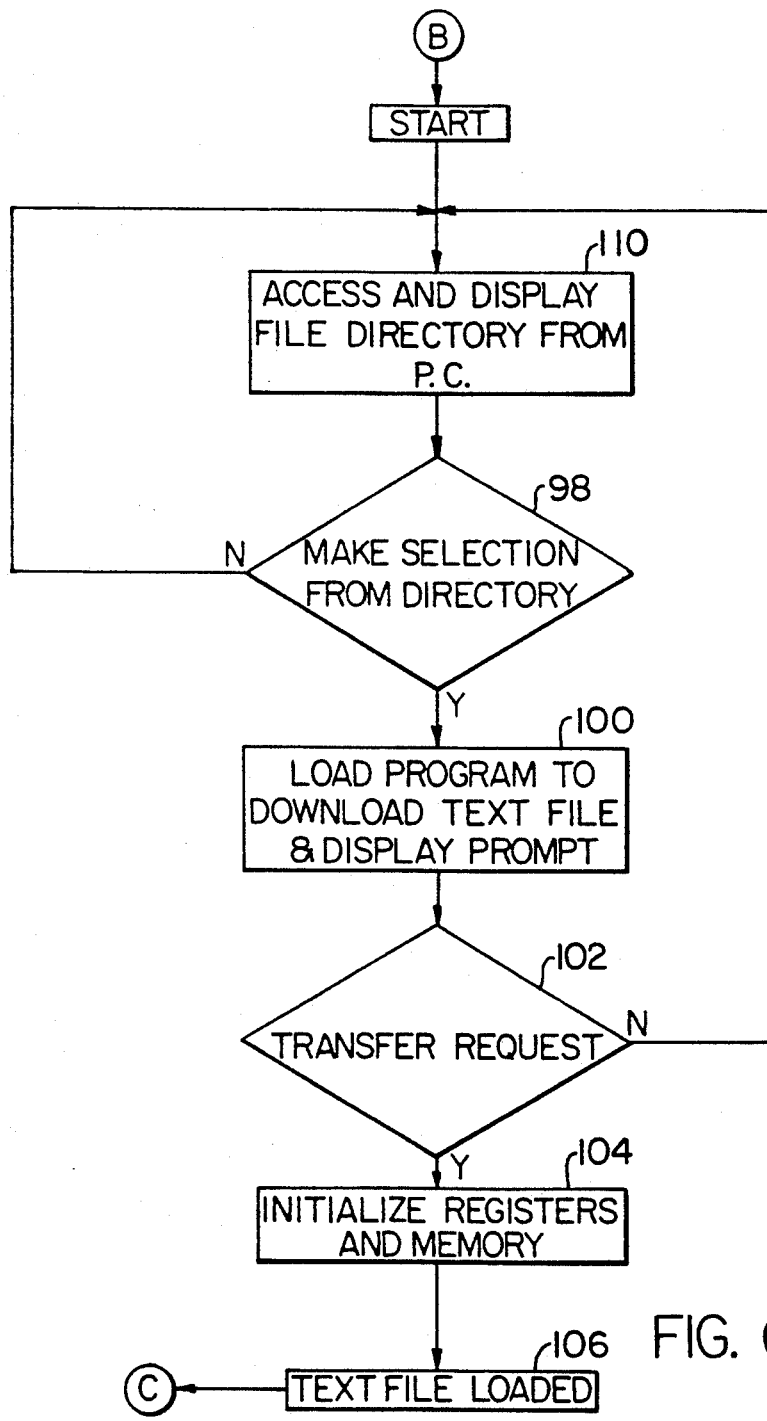

Referring now to FIGS. 6a and 6b, and in particular to the flowchart of the program for controlling the operations of the CPU 40 and the logic by which the CPU is made to follow, it should be seen that these operations are sequenced such that the user may readily access information in readable form without having to interact excessively with the reading unit 1. As discussed previously, the cover 4 of the reading unit 1 is linked to the switch 60 such that when it is opened, the system is powered up and the CPU 40 first checks for whether any pages of text in RAM have been left from the previous use (step 70). If no pages are left in RAM at this time, the RAM is initialized and the register is reset (step 74). The CPU 40 then is made to check the serial communication port 16 and the interface 48 to determine if an external device, such as the PC 70 shown in FIGS. 3 and 4 is connected (step 76). If such a connection exists and the PC 70 is found waiting to download information into the RAM 44, a separate subroutine is subsequently accessed and followed according to steps 100 through 110 as illustrated with reference to FIG. 6b and as will be discussed later in greater detail.

Assuming for the moment that after checking the serial port and interface, no live PC hookup is detected, the CPU 40 is then made to transmit a request for data from the EPROM source 41 (step 78) and if no EPROM source or other comparable device is detected, an error message is displayed (step 82). The speech synthesis program is consequently loaded (step 84) and an error message is subsequently audibly announced to the effect that the user must insert a memory device into the slot 18. If the EPROM device 41 or other storage device has been inserted into the slot 18, the data is then accessed and loaded into the RAM 44 (step 80) with the first or title page of the data being displayed on the screen 8 (step 86) in a default font size, for example, of approximately 12 point.

In the preferred embodiment of the invention, if data already resides in RAM at the time the book was opened (step 70), then the reading unit 1 will present the last displayed page rather than displaying the first or title page. This is accomplished by utilizing a register in RAM and supplying it with voltage from the long-life battery 58 during non-use periods as discussed previously. The user however need not be restricted to begin reading at the page which is automatically accessed and displayed at step 92, but rather may access any page desired at this point by using the numeric keypad 14 to specify a page number and by subsequently depressing the "ENTER" function to execute this command (step 94). This process can be repeated successively until the desired page is displayed (step 96). It is also noted at this point that the unit 1 can be made to present successively ordered windows of the text by simply tapping the "ENTER" button after each screen is read.

The user may utilize the font size select button 24 to alter the font size of the characters displayed on the screen 8 to one more comfortably facilitating the user's capabilities (step 88). As previously discussed with reference to FIGS. 3a and 3b, this is accomplished by employing a counting function (step 89) incremented by 1 every time the font size button is depressed. Once the desired font size is achieved, the user instructs the CPU to accept this size as the display size by, for example, depressing the scrolling forward indicator 12.

In the event that the user is blind or does not wish to alter the font size of the characters being displayed, he or she may then access the speech synthesis program by depressing the speech button 26 thus loading the speech synthesis program from the ROM 42 into the audio processor 52 for subsequently translating the resident text file code in RAM into audible output signals. During use, the reader having selected the page, font size or possibly the speech mode may now proceed to use the reading device 1 and further may choose to browse through the materials using the scroll keypad 12. At the end of the session, the page selection and font size are held in a register in RAM for the next session (step 72) and when the reading unit is closed, the power will be supplied to the RAM 44 in a reduced level maintaining this last displayed information in the register and the text files in the RAM 44.

Referring now to the protocol employed for interfacing with the external devices shown in FIGS. 4 and 5, and in particular to the PC 70, it should be seen that if after checking with the serial port 16, an active PC link is detected, and no other source is present at the data slot 18, the CPU 40 communicates via the interface 48 along the serial communication line 120 with the PC 70 and accesses its file directory to display it on the screen 8 of the reading unit 1 (step 110). Using the displayed directory, the user then can select a desired file from those listed in the file directory (step 98). Once a selection is made, a communication program is loaded (step 100) for accepting the selected text file and to prompt a display, such as "PRESS ENTER", to be shown instructing the user to begin loading the file from the PC source. The communication program loaded at step 100 is written in the same assembly language source code as that of the CPU 40. If the transfer is not initiated or is unsuccessful, the CPU 40 is made to return to the function block 98 wherein the computer file directory is again displayed. Once the transfer of the selected file is successful, the register and memory are initialized (step 104) and the text file is downloaded into RAM (step 106) and the program returns to the operations just prior to step 70.

By the foregoing, a portable, hand held reading unit 1 has been described in the preferred embodiment wherein means are provided for displaying text in variable font sizes for the visually impaired individual who would not otherwise comfortably be able to read. However, numerous modifications and substitutions may be made without departing from the spirit of the invention. For example, the component parts of the system architecture shown in FIG. 2 need not necessarily be limited to those disclosed therein, but rather may take the form of other comparable elements and arrangements that are commercially available today without departing from the spirit of the invention. Accordingly, the present invention has been described by way of illustration rather than limitation.

I claim:

1. A portable hand held reading unit for presenting textual data in readable form on a display screen, said unit comprising:
   a housing having a display screen for displaying data in the form of characters thereon;
   memory means for storing said data as computer usable code;
   external storage media means for providing said unit with said data inputted and stored in said memory means;
   interfacing means for allowing a user to select a different font size for the data displayed on said screen;
   variable font size means for displaying said data as characters on said screen in selectively different font sizes in response to instructions issued by a user through said interface means, said variable font size means further including a character shape altering means offering a selection of different character sizes in excess of two;
   said character shape altering means includes a plurality of storage locations in which are respectively stored differently sized bit mapped characters;
   each of said plurality of memory locations in which differently sized bit mapped characters are stored being selectively accessed when instructed by said interface means to do so;
   control means linked with said interface means, said memory means and with said display means for causing said characters to be displayed on said display screen in different font sizes according to the instructions directed to it by said interface means;
   said interfacing means including a font changing display means for operating a switch means linked to a counter means incremented each time said font changing display means is activated;

said control means utilizing said counter means to identify the one of said plurality of separate memory locations corresponding to the desired font size being selected; and wherein said control means utilizes the value in said counter means to drive said variable font size means for changing the font sizes of the characters displayed on said display screen incrementally in response to said font changing display means being touched by the user in succession to increment the counter means a given number of times until a character size comfortable to the reader is shown.

2. A portable hand held unit as defined in claim 1 further characterized in that said external storage media means is insertable into an opening formed in said housing.

3. A hand held reading unit device as defined in claim 2 further characterized in that said external storage media means is a transferable erasable and programmable read-only memory device (EPROM) capable of being readily inserted into a slot formed in said housing.

4. A hand held reading unit as defined in claim 3 further characterized in that said data is in the form of encoded characters of text taken from a book or a periodical.

5. A portable hand held reading unit as defined in claim 1 further characterized in that said memory means includes a volatile memory in which are stored character codes of the data inputted from said external storage media means; and wherein said unit further includes a rechargeable battery providing a continuous non-interrupted power source to said volatile memory while the unit is not in use.

6. A portable hand held reading unit as defined in claim 5 further characterized in that said housing includes a pivotal cover overlaying said screen and said unit is formed such that it provides a user with a look and feel of a book;

said cover being connected with a power-up switch for automatically powering up said screen and said control means when said cover is opened.

7. A portable hand held reading unit as defined in claim 2 further characterized in that said external storage media means is a mass storage data base in the form a personal computer, said personal computer being connected to a graphic scanner and a telephone modem; and wherein said reading unit and said personal computer being connected to one another by a serial communication port having an interface operating therebetween.

8. A portable hand held reading unit as defined in claim 1 further characterized in that said interface means includes font size select buttons, a digital keypad and scrolling arrows connected with said control means through an encoder.

9. A portable hand held reading unit as defined in claim 1 further characterized in that said switch is connected to an encoder and a signal is sent to said control means when said button is depressed.

10. A portable, hand held reading unit as defined in claim 1 further characterized in that said switch is connected to an encoder and a signal is sent to said control means when said button is depressed.

11. A portable hand held reading unit as defined in claim 1 further characterized in that said unit further includes an audio processor in which data from said memory means is transformed into audio output signals driving a speaker carried by said housing.

12. A method for displaying data in character form on a screen of a portable hand held reading unit, said method comprising:

providing in said unit memory means for storing textual data in character form;

inputting into said memory means textual data in character code form from an external memory source if no textual data already resides in said memory means when the unit is initially turned on;

providing means in said unit for loading data into said memory means from either a separate mass storage data base or from a storage source insertable into said unit;

providing external interfacing means and operatively connecting said interfacing means with said font size altering means, said interfacing means including a font changing display means for operating a switch means linked to a counter means incremented each time said font changing display means is activated;

providing means for altering the font size of said characters encoded and stored in said memory means, said font size altering means further including means for providing a selection of different character sizes in excess of two;

providing a plurality of storage locations in which are respectively stored differently sized bit mapped characters, each of said plurality of memory locations being selectively accessed when instructed by said interface means to do so;

utilizing said interfacing means to instruct said character altering means to change the font size of said characters to the next character size by issuing a command or a series of commands through said interfacing means to effect incrementing of said counter means as a result of the reader touching the font changing display means a given number of times so as to identify the one of said plurality of separate memory locations which corresponds to the desired character size displayed that is comfortable to the reader.

13. A method as defined in claim 12 further characterized in that said interfacing means is provided with a font size select button; and depressing said select button to change the character size to the next incremental font size.

14. A method as defined in claim 13 further characterized in that said step of inputting data from said external memory source further includes the step of determining whether a mass media storage device is connected to said unit prior to requesting data from a transportable memory device inserted into said unit.

15. A method as defined in claim 14 further characterized by providing a speech synthesis program and accessing said speech synthesis program to translate said textual data stored in said memory means into signals for presenting said data audibly after said textual data is inputted into said memory means.

16. A method as defined in claim 13 further characterized by first displaying the textual data last displayed during the previous use of said reading unit if said textual data resides in said memory means when the unit is first turned.

* * * * *